United States Patent
Kang et al.

(10) Patent No.: US 9,690,134 B2
(45) Date of Patent: Jun. 27, 2017

(54) DISPLAY DEVICE

(71) Applicant: LG Display Co., Ltd., Seoul (KR)

(72) Inventors: Seoung Mo Kang, Paju-si (KR); Eun Ju Kim, Paju-si (KR); Jin Ryun Kim, Seoul (KR); Young Ki Song, Paju-si (KR); Sang Dae Park, Goyang-si (KR); Yang Hwan Kim, Goyang-si (KR)

(73) Assignee: LG DIPLAY CO., LTD., Seoul (KR)

( * ) Notice: Subject to any disclaimer, the term of this patent is extended or adjusted under 35 U.S.C. 154(b) by 0 days.

(21) Appl. No.: 14/140,142

(22) Filed: Dec. 24, 2013

(65) Prior Publication Data
US 2014/0240641 A1    Aug. 28, 2014

(30) Foreign Application Priority Data
Feb. 28, 2013    (KR) .................. 10-2013-0022471

(51) Int. Cl.
*G02F 1/1335*    (2006.01)
*G02F 1/1333*    (2006.01)
*F21V 8/00*    (2006.01)

(52) U.S. Cl.
CPC .. *G02F 1/133528* (2013.01); *G02F 1/133308* (2013.01); *G02F 1/133615* (2013.01); *G02B 6/0056* (2013.01); *G02B 6/0088* (2013.01); *G02F 2001/133317* (2013.01); *G02F 2202/28* (2013.01)

(58) Field of Classification Search
CPC ......... G02F 1/133308; G02F 1/133528; G02F 2202/28; G02F 2001/133317; G02F 1/133615; G02B 6/0056; G02B 6/0088

USPC ...................................... 349/58, 62, 96, 110
See application file for complete search history.

(56) References Cited

U.S. PATENT DOCUMENTS

| | | | |
|---|---|---|---|
| 5,870,160 A * | 2/1999 | Yanagawa et al. ........... 349/141 |
| 6,359,668 B1 * | 3/2002 | Iijima ............... G02F 1/133536 |
| | | | 349/162 |
| 7,344,293 B2 | 3/2008 | Oami | |
| 7,667,784 B2 * | 2/2010 | Kim et al. ...................... 349/44 |
| 9,128,323 B2 * | 9/2015 | Kang .................... G02F 1/1336 |
| 2002/0033911 A1 | 3/2002 | Ishida et al. | |
| 2005/0094058 A1 | 5/2005 | Ide | |
| 2008/0261057 A1 | 10/2008 | Slobodin | |
| 2010/0053499 A1* | 3/2010 | Sasaki ............... G02F 1/133308 |
| | | | 349/62 |
| 2011/0026240 A1 | 2/2011 | Hayashi et al. | |

(Continued)

FOREIGN PATENT DOCUMENTS

| | | |
|---|---|---|
| CN | 101261397 A | 9/2008 |
| DE | 3140744 A1 | 4/1983 |

(Continued)

OTHER PUBLICATIONS

Computer translation of JP 2009-175234, Aug. 2008, pp. 1-11.*

*Primary Examiner* — Dung Nguyen
(74) *Attorney, Agent, or Firm* — Dentons US LLP

(57) ABSTRACT

Disclosed is a display device. The display device includes a liquid crystal panel, a backlight unit configured to include a light source that supplies light to the liquid crystal panel, and a polarizing part adhered to the liquid crystal panel. The polarizing part is formed to extend in an outer direction of the liquid crystal panel, and surrounds at least one of an outside of the liquid crystal panel and an outside of the backlight unit.

17 Claims, 9 Drawing Sheets

(56) References Cited

U.S. PATENT DOCUMENTS

| | | | |
|---|---|---|---|
| 2012/0133859 A1 | 5/2012 | Cha et al. | |
| 2012/0250354 A1 | 10/2012 | Yoshida | |
| 2013/0088666 A1* | 4/2013 | Ikeda et al. | 349/96 |
| 2013/0242483 A1* | 9/2013 | Hirasawa | 361/679.01 |
| 2014/0267980 A1* | 9/2014 | Kang | G02F 1/1336 349/62 |
| 2015/0036074 A1* | 2/2015 | Park | G02B 5/30 349/58 |
| 2017/0045672 A1* | 2/2017 | Lee | G02B 6/0056 |

FOREIGN PATENT DOCUMENTS

| | | |
|---|---|---|
| EP | 2639632 A1 | 9/2013 |
| JP | 07-029531 U | 6/1995 |
| JP | 10-260398 A | 9/1998 |
| JP | 2002341318 A | 11/2002 |
| JP | 2005243572 A | 9/2005 |
| JP | 2009175234 A | 8/2009 |
| JP | 2010078887 A | 4/2010 |
| JP | 2012208254 A | 10/2012 |
| JP | 2013190576 A | 9/2013 |
| KR | 10-1469719 | * 12/2014 |

\* cited by examiner

DISPLAY DEVICE

CROSS-REFERENCE TO RELATED APPLICATIONS

This application claims the benefit of the Korean Patent Application No. 10-2013-0022471 filed on Feb. 28, 2013, which is hereby incorporated by reference for all purposes as if fully set forth herein.

BACKGROUND OF THE INVENTION

Field of the Invention

The present invention relates to a display device.

Discussion of the Related Art

Generally, a related art liquid crystal display (LCD) device includes a liquid crystal panel, a backlight unit that is coupled under the liquid crystal panel, and a case top that is coupled on the liquid crystal panel.

In more detail, FIG. 1 illustrates a cross-sectional view of the related art LCD device. A related art backlight unit 20 includes a light source (not shown), a light guide panel 21, a plurality of optical sheets 22, a cover bottom 23, a reflective sheet 24, and a support main 25.

The light guide panel 21 transfers light from the light source toward a liquid crystal panel 10.

The plurality of optical sheets 22 collect and diffuse light transferred from the light guide panel 21.

The reflective sheet 24 reflects light, leaked from the light guide panel 21, toward the liquid crystal panel 10.

The cover bottom 23 accommodates the light source, the light guide panel 21, the plurality of optical sheets 22, and the reflective sheet 24.

The support main 25 is coupled to an inner side of the cover bottom 23 to support the liquid crystal panel 10.

The case top 30 is coupled to an upper edge of the liquid crystal panel 10 and an outer circumference surface of the cover bottom 23.

Therefore, the related art LCD device has a problem that a bezel area increases due to a structure including the support main 25 and the case top 30.

Especially, a width of a bezel that is an edge area of a display device increases due to an element such as the top case 30, and for this reason, there is a problem in realizing a narrow bezel.

In addition, since a total thickness of the backlight unit 20 becomes thicker, there is a problem in lightening and thinning the LCD device.

SUMMARY OF THE INVENTION

Accordingly, the present invention is directed to provide a display device that substantially obviates one or more problems due to limitations and disadvantages of the related art.

An aspect of the present invention is directed to provide a display device in which a liquid crystal panel is integrated with a backlight unit by using a polarizing part surrounding at least one of the outside of the liquid crystal panel and the outside of the backlight unit.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a liquid crystal panel; a backlight unit configured to include a light source that supplies light to the liquid crystal panel; and a polarizing part adhered to the liquid crystal panel, wherein the polarizing part is formed to extend in an outer direction of the liquid crystal panel, and surrounds at least one of an outside of the liquid crystal panel and an outside of the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
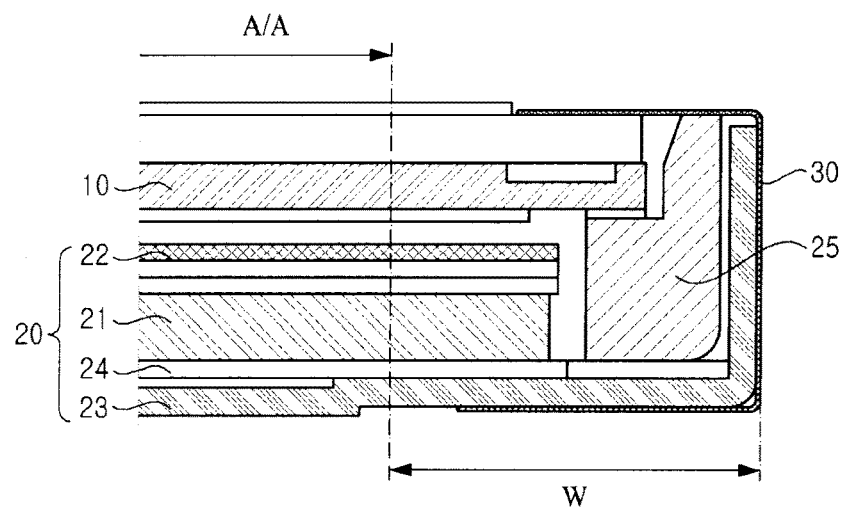
FIG. 1 is a cross-sectional view illustrating a related art LCD device.

Advantages and features of the present invention, and implementation methods thereof will be clarified through the following embodiments described with reference to the accompanying drawings. In respectively adding reference numerals to elements of each drawing, detailed descriptions related to well-known functions or configurations will be ruled out in order not to unnecessarily obscure subject matters of the present invention. Also, it will be understood that although the terms first and second are used herein to describe various elements, these elements should not be limited by these terms. These terms are only used to distinguish one element from another element. In the following description, when the detailed description of the relevant known function or configuration is determined to unnecessarily obscure the important point of the present invention, the detailed description will be omitted.

Hereinafter, embodiments of the present invention will be described in detail with reference to the accompanying drawings.

Figure 2:
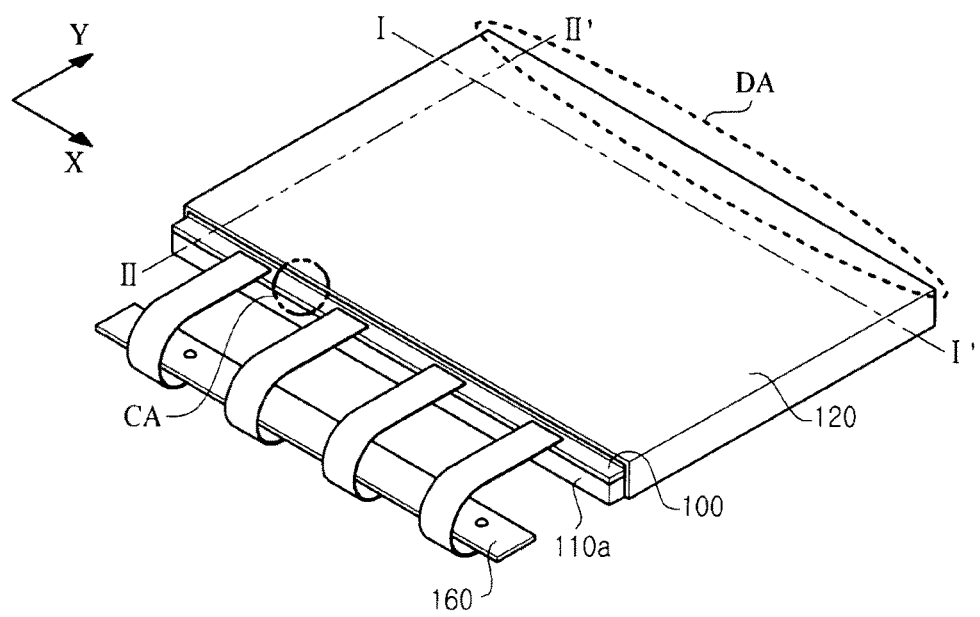
FIG. 2 is a coupled perspective view illustrating a display device according to the present invention.
Figure 3A:
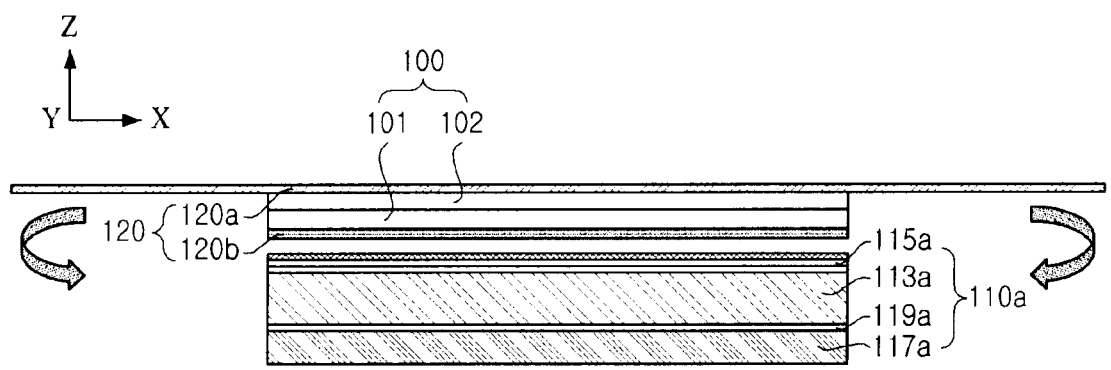
FIGS. 3A to 3C are cross-sectional views taken along line I-I' of FIG. 1 and illustrating a first embodiment of the display device according to the present invention.
Figure 3B:
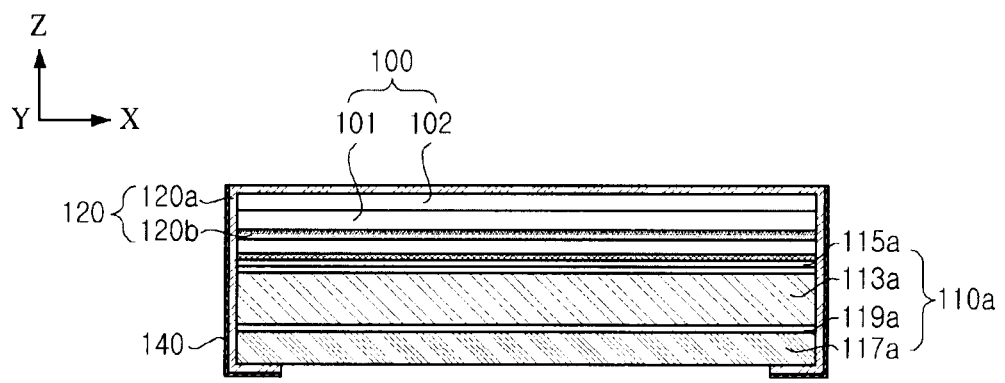
Figure 3C:
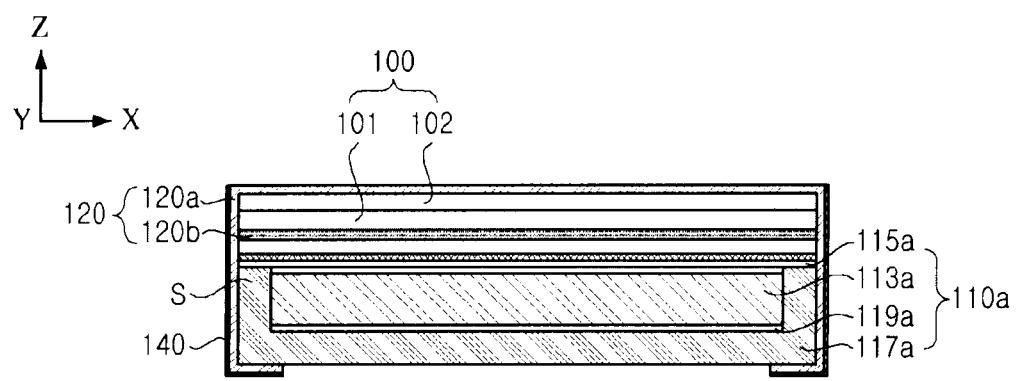

FIG. 2 is a perspective view illustrating a display device according to the present invention, and FIGS. 3A to 3C are cross-sectional views taken along line I-I' of FIG. 1 and illustrating a first embodiment of the display device according to the present invention. As illustrated, the display device includes a liquid crystal panel 100, a backlight unit 110a that includes a light source (not shown) for supplying light to the liquid crystal panel 100, and a polarizing part 120 that surrounds at least one of the outside of the liquid crystal panel 100 and the outside of the backlight unit 110a.

The liquid crystal panel 100, as illustrated in FIGS. 3A to 3C, includes an array substrate 101, a color substrate 102, and a liquid crystal layer (not shown) disposed between the array substrate 101 and the color substrate 102.

A side sealing part for preventing a damage (caused by an external impact) and light leakage of the liquid crystal panel 100 may be formed outside the liquid crystal panel 100.

The liquid crystal panel 100 displays an image according to light supplied from the light source passing through the liquid crystal layer.

An external power source and a power data supplying member 160 for supplying a gate signal and data signals may be connected to the liquid crystal panel 100 in a direction in which the light source is disposed.

The power data supplying member 160 may be configured with a flexible circuit board and a chip-on film (COF) that is connected to the circuit board at one end of the COF and connected to the liquid crystal panel 100 at the other end.

In the COF, a board is formed by stacking a copper foil on polymide (a polymer material) and then forming a circuit. A driving circuit (drive IC), a circuit that generate source signals and the gate signal for driving the liquid crystal panel 100, may be bonded and mounted onto the board.

As illustrated in FIG. 2, the polarizing part 120 is formed to extend in an outer direction of the liquid crystal panel 100, and surrounds the outside of the display device.

That is, the polarizing part 120 surrounds at least one of the outside of the liquid crystal panel 100 and the outside of the backlight unit 110a depending on a position coupled to the display device.

More specifically, as illustrated in FIGS. 3A to 3C, the polarizing part 120 includes a first polarizing member 120a and a second polarizing member 120b, for surrounding at least one of the outside of the liquid crystal panel 100 and the outside of the backlight unit 110a.

A bending part is provided at one surface of at least one of the first and second polarizing parts 120a and 120b.

That is, the bending part to be specifically described below guides the first polarizing member 120a or the second polarizing member 120b being bent toward the outside of the liquid crystal panel 100 or the outside of the backlight unit 110a.

Figure 4A:
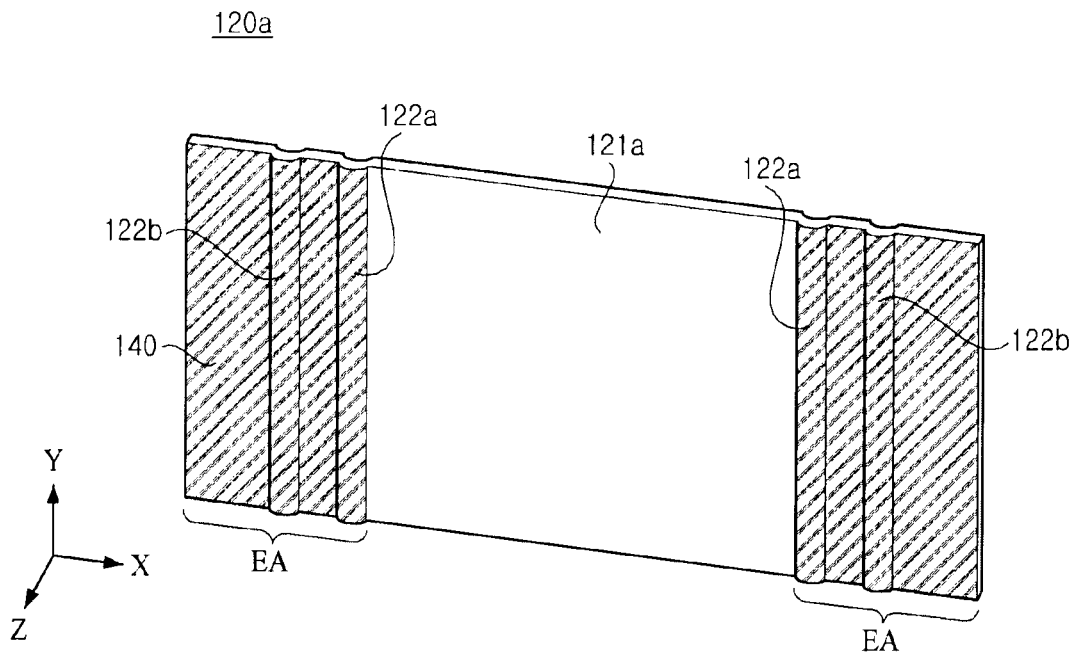
FIGS. 4A and 4B are perspective views illustrating a polarizing member configuring the display device of the present invention.
Figure 4B:
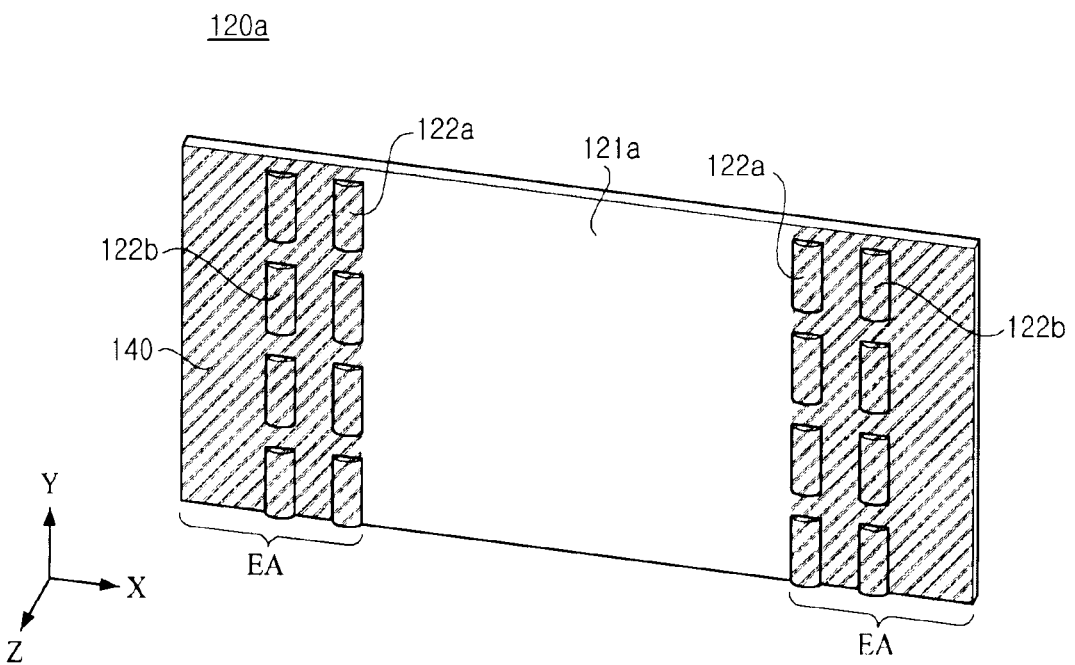

FIGS. 4A and 4B are perspective views illustrating the polarizing members configuring the display device of the present invention. To describe the first polarizing member 120a configuring the polarizing part 120 as an example, as illustrated, each of a plurality of bending parts 122a and 122b is provided in plurality to be separated from each other by a certain interval, at one surface 121a of the first polarizing member 120a.

More specifically, the bending parts 122a and 122b are formed at an extension part EA of the first polarizing member 120a which is formed to extend for surrounding the outside of the liquid crystal panel 100 and the outside of the backlight unit 110a.

That is, the bending parts 122a and 122b guides the first polarizing member 120a to be easily bent, for surrounding the outside of the liquid crystal panel 100 and the outside of the backlight unit 110a.

As illustrated in FIG. 3A, the first polarizing member 120a is coupled on the liquid crystal panel 100.

Therefore, as illustrated in FIG. 4A, the first polarizing member 120a is primarily bent at an upper distal end of the liquid crystal panel 100 by using the bending part 122a.

Subsequently, the first polarizing member 120a is secondarily bent for surrounding the outside of the backlight unit 110a, namely, for surrounding a side surface and then surrounding a rear surface of the backlight unit 110a, by using the bending part 122b.

Therefore, the first polarizing member 120a surrounds the outside of the liquid crystal panel 100 and the outside of the backlight unit 110a.

However, in the present invention, the number of bending parts 122a and 122b provided at one surface of the first polarizing member 120a is not limited.

In FIG. 4A, the bending parts 122a and 122b are formed in a direction parallel to a Y direction with respect to the coordinate axis, but the bending parts are also provided in an X direction. Accordingly, the bending parts may be provided in all directions of the one surface 121a of the first polarizing member 120a.

Further, as illustrated in FIG. 4A, the bending parts 122a and 122b may be provided to have a linear shape.

In addition, as illustrated in FIG. 4B, the bending parts 122a and 122b may be provided to have a discontinuous shape.

Figure 5A:
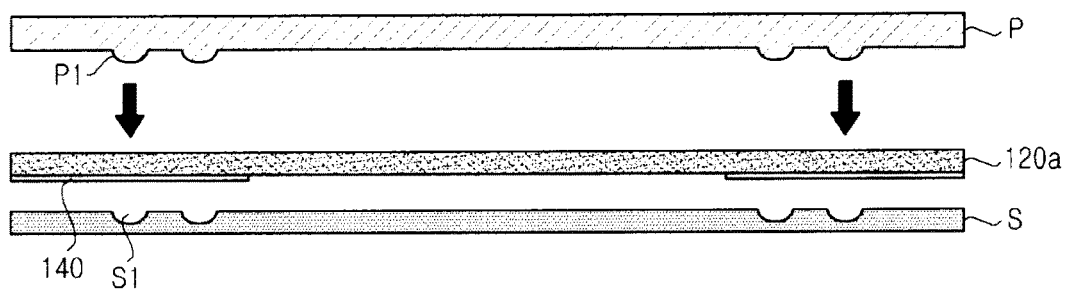
FIGS. 5A to 5C are cross-sectional views illustrating a method of manufacturing the polarizing member of FIG. 4A.
Figure 5B:
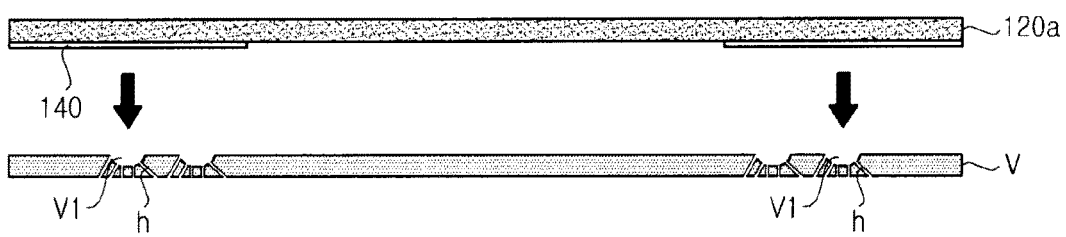
Figure 5C:
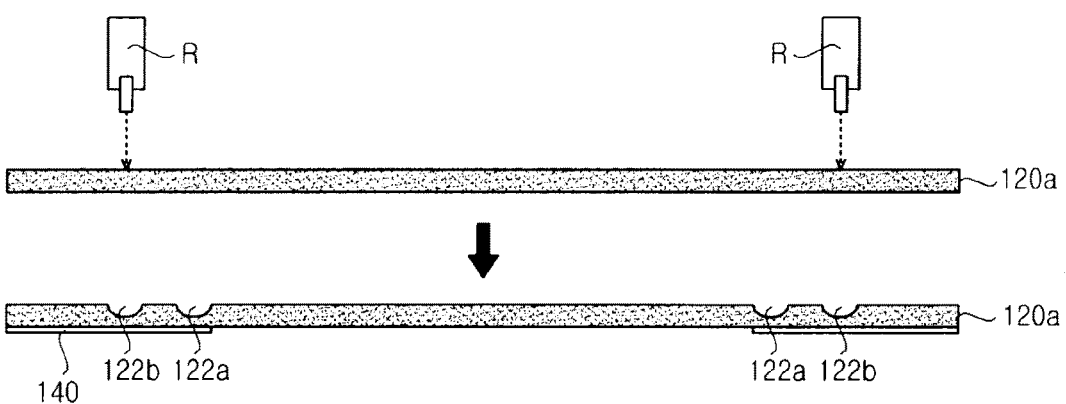

FIGS. 5A to 5C are cross-sectional views illustrating a method of manufacturing the polarizing member of FIG. 4A. As illustrated, the bending parts 122a and 122b may be provided at the first polarizing member 120a by various manufacturing methods.

As illustrated in FIGS. 5A and 4A, the bending parts 122a and 122b may be provided at the one surface 121a of the first polarizing member 120a by using a press manufacturing method.

First, a light leakage preventing member 140 to be described below is coupled to the one surface 121a of the first polarizing member 120a at which the bending part will be provided.

Subsequently, the first polarizing member 120a is disposed on a stage S including a negative pattern S1 having the same shape as the bending parts 122a and 122b, and is pressurized by a press apparatus P.

Therefore, the bending parts 122a and 122b are formed at the one surface 121a of the first polarizing member 120a, and more specifically, at an area with the light leakage preventing member 140 coupled thereto.

As illustrated in FIGS. 5B and 4A, the bending parts 122a and 122b may be provided at the one surface 121a of the first polarizing member 120a by using a vacuum-molding manufacturing method.

First, the first polarizing member 120a is elongated for a certain time at a certain temperature.

Subsequently, the light leakage preventing member 140 to be described below is coupled to the one surface 121a of the first polarizing member 120a at which the bending part will be provided.

Subsequently, the first polarizing member 120a is disposed on a vacuum adsorption stage V that includes a negative pattern V1 having the same shape as the bending parts 122a and 122b. Here, the negative pattern V1 is configured with a plurality of holes h formed at the vacuum adsorption stage V.

Subsequently, the first polarizing member 120a is absorbed through the holes h in a direction of the vacuum adsorption stage V.

Therefore, the bending parts 122a and 122b are formed at the one surface 121a of the first polarizing member 120a.

As illustrated in FIG. 5C, the bending parts 122a and 122b may be provided at the first polarizing member 120a by using a laser irradiating method.

The bending parts 122a and 122b formed by the laser irradiating method have a groove shape unlike a shape of the bending parts formed by the above-described press manufacturing method and the vacuum-molding manufacturing method.

First, a plurality of laser irradiating parts R which are separated from each other at certain intervals are disposed on the first polarizing member 120a.

Subsequently, by irradiating a laser on the first polarizing member 120a, the bending parts 122a and 122b having a groove shape are formed at the first polarizing member 120a.

Subsequently, the below-described light leakage preventing member 140 is coupled to the one surface 121a of the first polarizing member 120a.

The bending part, which guides the first polarizing member 120a or the second polarizing member 120b to be easily bent, may be formed at one surface of the first polarizing member 120a or the second polarizing member 120b by using the method of manufacturing the bending part which has been described above through various embodiments with reference to FIGS. 5A to 5C.

As illustrated in FIGS. 3A to 3C that illustrate cross-sectional views taken along line I-I' of FIG. 1 and illustrating the first embodiment of the display device according to the present invention, the polarizing part 120 includes the first polarizing member 120a and the second polarizing member 120b.

More specifically, the first polarizing member 120a is adhered to the liquid crystal panel 100, and the second polarizing member 120b is adhered under the liquid crystal panel 100.

Therefore, the second polarizing member 120b polarizes light passing through the backlight unit 110a, and transfers the polarized light to the liquid crystal panel 100.

Moreover, the first polarizing member 120a polarizes light passing through the liquid crystal panel 100 so as to enable an external user to view an image.

As illustrated in FIG. 3A, the first polarizing member 120a is formed to extend in an outer direction of the liquid crystal panel 100.

More specifically, as illustrated in FIG. 2, a side surface of the first polarizing member 120a which is disposed in a direction vertical to the light source disposed in a direction (the X-axis direction) in which the power data supplying member 160 is connected is formed to extend in the X-axis direction.

That is, as illustrated in FIGS. 3A to 3C, the first polarizing member 120a surrounds all the outside of the liquid crystal panel 100 and the outside of the backlight unit 110a.

A structure such as the case top and the guide panel configuring the related art display device is removed, and the liquid crystal panel 100 is integrated with the backlight unit 110a by using the first polarizing member 120a configuring the polarizing part 120, thus lightening the display device.

In addition, the liquid crystal panel 100 is closely adhered to the backlight unit 110a by using the first polarizing member 120a, and thus can thin the display device and enhance coupling power.

Moreover, in the first polarizing member 120a of FIGS. 3A to 3C, only a side surface vertical to the light source is formed to extend in the X-axis direction, but a side surface of the first polarizing member 120a parallel to the light source may be formed to extend in the Y-axis direction.

Therefore, as illustrated in FIG. 2, except the power data supplying member 160, a CA area and a DA area opposite thereto (which are partial areas of the display device) may be surrounded by the first polarizing member 120a.

That is, in the first polarizing member 120a, surfaces parallel to the light source are also formed to extend, and therefore, as illustrated in FIG. 2, the first polarizing member 120a surrounds the CA area and DA area opposite thereto of the display device, thus enhancing coupling power between the liquid crystal panel 100 and the backlight unit 110a.

As illustrated in FIGS. 3A and 3C, the light leakage preventing member 140 that prevents a light leakage of the light source may be coupled to the polarizing part 120.

In more detail, the light leakage preventing member 140 may be coupled to at least one of one surface and the other surface of the polarizing part 120 that surrounds the outside of the liquid crystal panel 100 and the outside of the backlight unit 110a. That is, as illustrated in FIGS. 3B and 3C, the light leakage preventing member 140 is coupled to an outer surface of the first polarizing member 120a that surrounds the outside of the liquid crystal panel 100 and the outside of the backlight unit 110a. Alternatively, the light leakage preventing member 140 may be coupled to an inner surface of the first polarizing member 120a. Therefore, light of the light source is prevented from being leaked to outside the display device.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device.

When the light leakage preventing member 140 is coupled to the inner surface of the first polarizing member 120a, a member having a color instead of black may be coupled to the outer surface of the first polarizing member 120a. For example, when the light leakage preventing member 140 is coupled to the inner surface of the first polarizing member 120a, a member having a fluorescent color may be coupled to the outer surface of the first polarizing member 120a, thus providing a beautiful design to a user.

Figure 6:
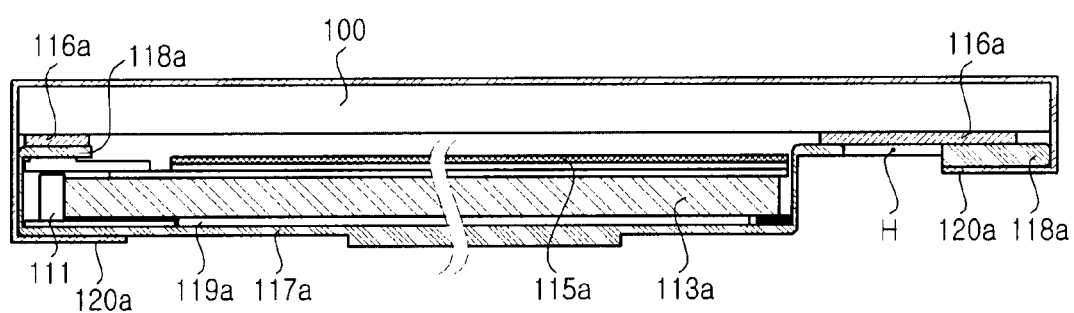
FIG. 6 is a cross-sectional view taken along line II-II' of FIG. 1 and illustrating a backlight unit configuring the display device according to the present invention.

FIG. 6 is a cross-sectional view taken along line II-II' of FIG. 2 and illustrates a backlight unit of the display device according to the present invention. As illustrated, the backlight unit 110a of the display device includes a light guide panel 113a, a plurality of optical sheets 115a, an accommodating member 117a, and a reflective sheet 119a.

The light guide panel 113a changes light, which is incident from the light source 111, to flat light and supplies the flat light to the liquid crystal panel 100.

The plurality of optical sheets 115a collect and diffuse the light transferred from the light guide panel 113a.

In more detail, the plurality of optical sheets 115a may include at least one diffusive sheet and at least one light collecting sheet disposed on the diffusive sheet.

The diffusive sheet may diffuse light which is incident toward the liquid crystal panel 100 through the light guide panel 113a, and simultaneously adjust a direction of the diffused light so as to travel the light toward the light collecting sheet.

Moreover, the light collecting sheet collects light, which is incident through the diffusive sheet, in a direction vertical to the liquid crystal panel 100.

An accommodating part for accommodating the light guide panel 113a and the plurality of optical sheets 115a is formed in the accommodating member 117a.

Moreover, the accommodating member 117a includes a plurality of supporting parts 118a for supporting the liquid crystal panel 100.

A form pad type of coupling member 116a that includes both surfaces of an adhesive material and has elastic power is disposed on the supporting part 118a, for fixing and coupling the backlight unit 110 to the liquid crystal panel 100.

Moreover, as illustrated in FIG. 3C, the accommodating member 117a may further include a side reinforcing member S that is formed to protrude toward the liquid crystal panel 100, for protecting the light guide panel 113a, the plurality of optical sheets 115a, and the reflective sheet 119a against an external impact.

The reflective sheet 119a is disposed between the light guide panel 113a and the cover bottom 117a to reflect light, leaked from the light guide panel 113a, toward the liquid crystal panel 100.

To summarize, as described above with reference to FIGS. 2, 3A and 4A, a side surface of the first polarizing member 120a in a direction vertical to the light source is formed to extend, and thus, the first polarizing member 120a surrounds the outside of the liquid crystal panel 100 and the outside of the backlight unit 110a.

In addition, a side surface of the first polarizing member 120a in a direction parallel to the light source 111 is also formed to extend in an outer direction of the liquid crystal panel 100, and thus, as illustrated in FIGS. 2 and 6, the first polarizing member 120a surrounds the CA area and DA area opposite thereto of the display device.

Therefore, all outer sides of the display device can be surrounded by the first polarizing member 120a.

More specifically, as illustrated in FIG. 6, the first polarizing member 120a may surround the outside of the accommodating member 117a in a direction (the CA area of FIG. 2) in which the light source 111 is disposed.

Moreover, the first polarizing member 120a may surround the outside of the accommodating member 117a in a direction (the DA area of FIG. 2) in which the through hole h for externally exposing a lens part of a camera is formed.

Therefore, the first polarizing member 120a can surround the outside of the liquid crystal panel 100 and the outside of the accommodating member 117a configuring the backlight unit 110, thus enhancing coupling power between the liquid crystal panel 100 and the backlight unit 110.

Figure 7:
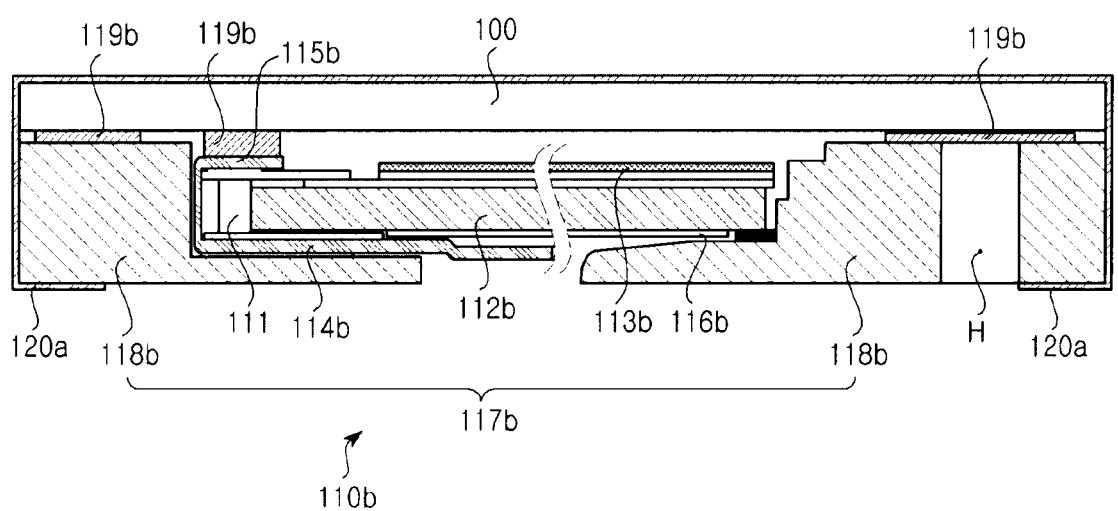
FIG. 7 is a cross-sectional view taken along line II-II' of FIG. 1 and illustrating another embodiment of a backlight unit configuring the display device according to the present invention.

FIG. 7 is a cross-sectional view taken along line II-II' of FIG. 2 and illustrates another embodiment of a backlight unit of a display device according to the present invention. As illustrated, the backlight unit 110b configuring the display device includes a light guide panel 112a, a plurality of optical sheets 113b, a light source accommodating member 114b, a reflective sheet 115b, and a liquid crystal panel supporting part 116b.

The light guide panel 112b changes light, which is incident from the light source 111, to flat light and supplies the flat light to the liquid crystal panel 100.

The plurality of optical sheets 113b collect and diffuse the light transferred from the light guide panel 112b.

In more detail, the plurality of optical sheets 113b may include at least one diffusive sheet and at least one light collecting sheet.

The diffusive sheet may diffuse light which is incident toward the liquid crystal panel 100 through the light guide panel 112b, and simultaneously adjust a direction of the diffused light so as to travel the light toward the light collecting sheet.

Moreover, the light collecting sheet collects light, which is incident through the diffusive sheet, in a direction vertical to the liquid crystal panel 100.

As illustrated in FIG. 7, an accommodating space for accommodating the light guide panel 112b is formed in the light source accommodating member 114b, and a cross-sectional surface of the light source accommodating member 114b is formed in a ⊂-shape. Moreover, the light source accommodating member 114b includes a supporting part 115b that covers a portion of a light incident part of the light guide panel 112b facing the light source 111 and supports the liquid crystal panel 100.

The reflective sheet 116b reflects light, leaked from the light guide panel 112b, toward the liquid crystal panel 100.

The liquid crystal panel supporting part 117b includes an accommodating space that is formed for accommodating the light guide panel 112b, the plurality of optical sheets 113b, the light source accommodating member 114b coupled to the inside of the light source 111, and the reflective sheet 116b.

Further, the liquid crystal panel supporting part 117b includes a plurality of supporting members 118b for supporting the liquid crystal panel 100.

In more detail, the liquid crystal panel supporting part 117b includes a first supporting member 118b and a second supporting member 118b.

The first supporting member 118b is formed to protrude in a direction from the liquid crystal panel supporting part 117b to the liquid crystal panel 100 so as to surround an outer circumference surface of the light source accommodating member 114b having a ⊂-shape.

The second supporting member 118b is formed to protrude in a direction from the liquid crystal panel supporting part 117b to the liquid crystal panel 100 so as to be opposite to a non-incident part of the light guide panel 112b.

Moreover, the second supporting member 118b includes a plurality of stepped portions such that the reflective sheet 116b, the light guide panel 112b, and the plurality of optical sheets 113b are sequentially stacked in the liquid crystal panel supporting part 117b.

Therefore, as illustrated in FIG. 7, the first supporting member 118b, the second supporting member 118b, and the light source accommodating member 114b may simultaneously support the liquid crystal panel 100.

A form pad type of coupling member 119b that includes both surfaces of an adhesive material and has elastic power is disposed on the first supporting member 118b, the second supporting member 118b, and the supporting part 115b which face the liquid crystal panel 100, and thus, the backlight unit 110b can be fixed and coupled to the liquid crystal panel 100.

Moreover, the liquid crystal panel supporting part 117b may further include a side reinforcing member (not shown) that is formed to protrude toward the liquid crystal panel 100, for protecting the light guide panel 112b, the plurality of optical sheets 113b, the light source accommodating member 114b, and the reflective sheet 116b against an external impact.

As described above with reference to FIGS. 2, 3A and 4A, in addition to both side surfaces of the first polarizing member 120a vertical to the light source 111, both side surfaces of the first polarizing member 120a parallel to the light source 111 may be formed to extend in an outer direction of the liquid crystal panel 100.

Therefore, as illustrated in FIGS. 2 and 7, the first polarizing member 120a surrounds the CA area of DA area opposite thereto of the display device, thereby surrounding all surfaces of the display device.

That is, as illustrated in FIG. 7, the first polarizing member 120a may surround the outside of the first supporting member 118b configuring the liquid crystal panel supporting part 117b in a direction (the CA area of FIG. 2) in which the light source 111 is disposed.

Moreover, the first polarizing member 120a may surround the outside of the second supporting member 118b configuring the liquid crystal panel supporting part 117b in a direction (the DA area of FIG. 2) in which the through hole h for externally exposing the lens part of the camera is formed.

Therefore, the first polarizing member 120a can surround the outside of the liquid crystal panel 100 and the outside of the liquid crystal panel supporting part 117b configuring the backlight unit 110b, thus enhancing coupling power between the liquid crystal panel 100 and the backlight unit 110b.

Figure 8A:
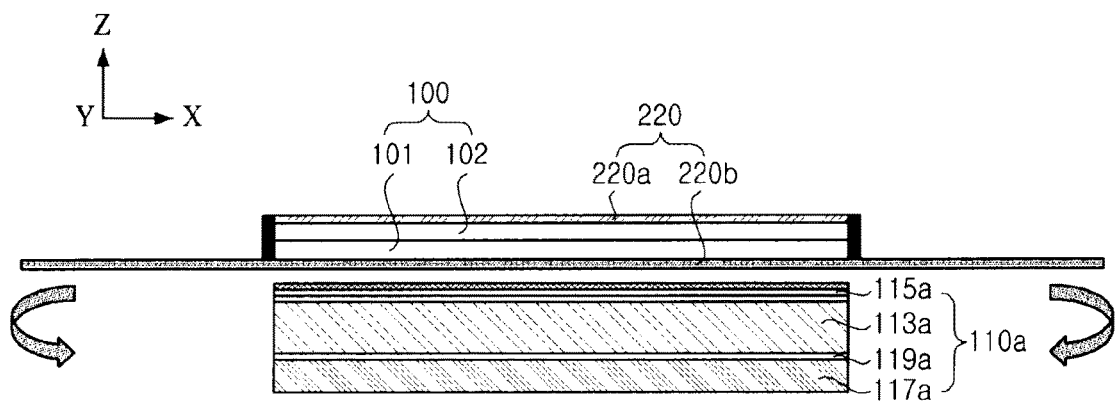
FIGS. 8A and 8B are cross-sectional views taken along line I-I' of FIG. 1 and illustrating a second embodiment of a display device according to the present invention.
Figure 8B:
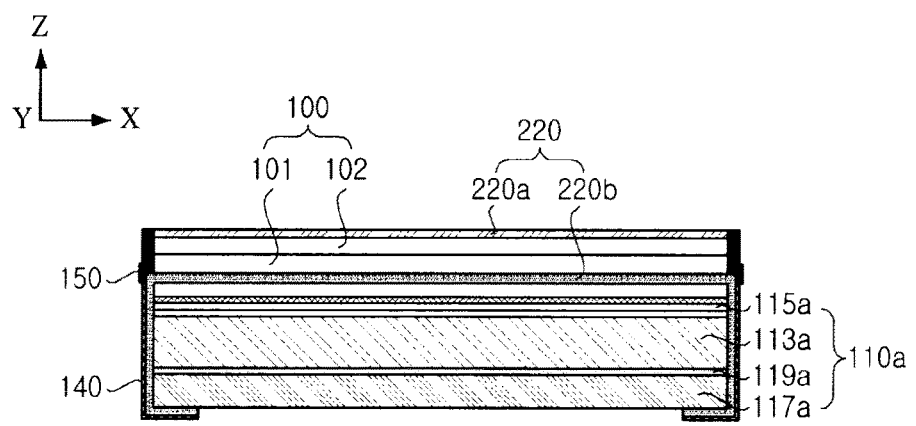

FIGS. 8A and 8B are cross-sectional views taken along line I-I' of FIG. 1 and illustrating a second embodiment of a display device according to the present invention. In describing the embodiment, a description on elements equal to or corresponding to the preceding embodiment is not provided. Hereinafter, a display device according to the embodiment will be described with reference to FIGS. 8A and 8B.

The display device according to the second embodiment of the present invention includes a liquid crystal panel 100, a backlight unit 110a including a light source that supplies light to the liquid crystal panel 100, and a polarizing part 220.

The polarizing part 220 configuring the display device includes a first polarizing member 220a and a second polarizing member 220b.

In more detail, the first polarizing member 220a is adhered onto the liquid crystal panel 100, and the second polarizing member 220b is adhered to under the liquid crystal panel 100.

Moreover, as illustrated in FIG. 8A, the second polarizing member 220b is formed to extend in an outer direction of the liquid crystal panel 100.

That is, as illustrated in FIGS. 2 and 8A, a side surface of the second polarizing member 220b in a direction vertical to the light source, which is disposed in a direction (the X-axis direction) in which the power data supplying member 160 is connected, is formed to extend in the X-axis direction.

Similarly to the first polarizing member 120a which has been described above with reference to FIGS. 4A and 4B, a bending part that guides the second polarizing member 220b being bent for surrounding the outside of the backlight unit 110a is formed at one surface of the second polarizing member 220b.

Therefore, as illustrated in FIG. 8B, the second polarizing member 220b surrounds the outside of the backlight unit 110a.

The structure such as the case top and the guide panel configuring the related art display device is removed, and the liquid crystal panel 100 is integrated with the backlight unit 110a by using the second polarizing member 220b configuring the polarizing part 220, thus lightening the display device.

Moreover, in the second polarizing member 220b of FIGS. 8A and 8B, a side surface vertical to the light source is formed to extend in the X-axis direction, but a side surface of the second polarizing member 220b parallel to the light source may be formed to extend in the Y-axis direction.

Therefore, as illustrated in FIG. 2, except the power data supplying member 160, a CA area and a DA area opposite thereto (which are partial areas of the display device) may be surrounded by the second polarizing member 220b.

That is, in the second polarizing member 220b, surfaces parallel to the light source are also formed to extend, and therefore, as illustrated in FIG. 2, the second polarizing member 220b surrounds the CA area and DA area opposite thereto of the display device, thus enhancing coupling power between the liquid crystal panel 100 and the backlight unit 110a.

As illustrated in FIG. 8B, the light leakage preventing member 140 that prevents a light leakage of the light source may be coupled to the polarizing part 220.

In more detail, the light leakage preventing member 140 may be coupled to at least one of one surface and the other surface of the polarizing part 220 that surrounds the outside of the backlight unit 110a.

That is, as illustrated in FIG. 8B, the light leakage preventing member 140 is coupled to an outer surface of the second polarizing member 220b that is formed to extend in an outer direction of the liquid crystal panel 100 and surrounds the outside of the backlight unit 110a.

Alternatively, the light leakage preventing member 140 may be coupled to an inner surface of the second polarizing member 220b.

Therefore, light of the light source is prevented from being leaked to outside the display device.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device.

When the light leakage preventing member 140 is coupled to the inner surface of the second polarizing member 220b, a member having a color instead of black may be coupled to the outer surface of the second polarizing member 220b.

For example, when the light leakage preventing member 140 is coupled to the inner surface of the second polarizing member 220b, a member having a fluorescent color may be coupled to the outer surface of the second polarizing member 220b, thus providing a beautiful design to a user.

As illustrated in FIGS. 8A and 8B, a side sealing part for preventing a damage (caused by an external impact) and light leakage of the liquid crystal panel 100 may be formed at a side surface of the liquid crystal panel 100.

Moreover, a sealing member 150 may be coated on an outer surface of the light leakage preventing member 140 surrounding the outside of the backlight unit 110a and on the outside of the liquid crystal panel 100.

Therefore, coupling power between the liquid crystal panel 100 and the backlight unit 110a can be enhanced.

Figure 9A:
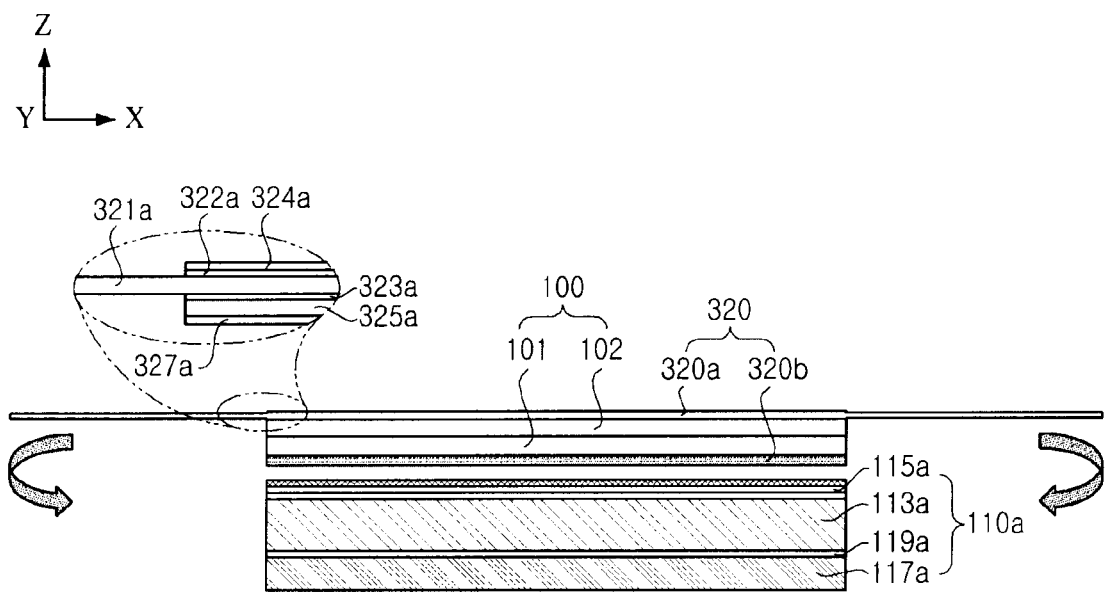
FIGS. 9A and 9B are cross-sectional views taken along line I-I' of FIG. 1 and illustrating a third embodiment of a display device according to the present invention.
Figure 9B:
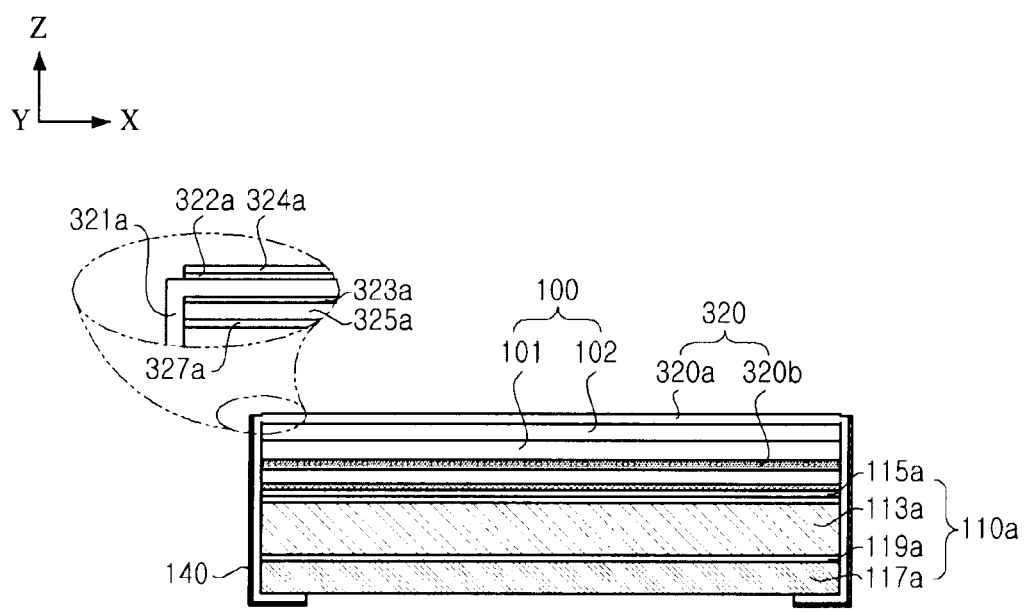

FIGS. 9A and 9B are cross-sectional views taken along line I-I' of FIG. 2 and illustrating a third embodiment of a display device according to the present invention. In describing the embodiment, a description on elements equal to or corresponding to the preceding embodiment is not provided. Hereinafter, a display device according to the embodiment will be described with reference to FIGS. 8A and 8B.

The display device according to the third embodiment of the present invention includes a liquid crystal panel 100, a backlight unit 110a including a light source that supplies light to the liquid crystal panel 100, and a polarizing part 320.

The polarizing part 320 configuring the display device includes a first polarizing member 320a and a second polarizing member 320b.

In more detail, the first polarizing member 320a is adhered onto the liquid crystal panel 100, and the second polarizing member 320b is adhered to under the liquid crystal panel 100.

As illustrated in an enlarged view of FIG. 9A, the first polarizing member 320a includes a triacetyl cellulose (TAC) layer 321a.

Moreover, the first polarizing member 320a includes a pressure sensitive adhesive (PSA) layer 322a stacked on the TAC layer 321a and a protective film layer 324a stacked on the PSA layer 322a.

In addition, the first polarizing member 320a includes a poly vinyl alcohol (PVA) layer 323a stacked under the TAC layer 321a, a TAC layer 325a stacked under the PVA layer 323a, and a PSA layer 327a adhered to under the TAC layer 325a.

Each of the layers forming the first polarizing member 320a will now be described with reference to FIG. 9A.

The TAC layer 321a is a protective layer for protecting the PVA layer 323a, and is formed of a transparent material.

The PSA layer 322a is a pressure sensitive adhesive layer, and adheres the protective film layer 324a onto the TAC layer 321a.

The protective film layer 324a is a film for protecting the first polarizing member 320a against an external impact, a scratch, a foreign material, etc.

The PVA layer 323a polarizes light passing through the liquid crystal panel 100.

The TAC layer 325a have the same material and function as those of the above-described TAC layer 321a.

Finally, the PSA layer 327a have the same material and function as those of the above-described PSA layer 322a.

Similarly to the first polarizing member 120a which has been described above with reference to FIG. 4A, a bending part that guides the first polarizing member 320a being bent for surrounding the outside of the liquid crystal panel 100 and the outside of the backlight unit 110a is formed at one surface of the TAC layer 321a configuring the first polarizing member 320a.

Therefore, as illustrated in FIG. 9B, the TAC layer 321a configuring the first polarizing member 320a surrounds the outside of the liquid crystal panel 100 and the outside of the backlight unit 110a.

As illustrated in FIG. 9A, the TAC layer 321a is formed to extend in an outer direction of the liquid crystal panel 100.

That is, as illustrated in FIGS. 2 and 3A, a side surface of the TAC layer 321a in a direction vertical to the light source, disposed in a direction in which the power data supplying member 160 is connected, is formed to extend in the X-axis direction.

Therefore, as illustrated in FIG. 9B, the TAC layer 321a configuring the first polarizing member 320a surrounds all the outside of the liquid crystal panel 100 and the outside of the backlight unit 110a.

The structure such as the case top and the guide panel configuring the related art display device is removed, and the liquid crystal panel 100 is integrated with the backlight unit 110a by using the TAC layer 321a, thus lightening the display device.

Moreover, in the TAC layer 321a configuring the first polarizing member 320a of FIGS. 9A and 9B, a side surface vertical to the light source is formed to extend in the X-axis direction, but a side surface of the TAC layer 321a parallel to the light source may be formed to extend in the Y-axis direction.

Therefore, as illustrated in FIG. 2, except the power data supplying member 160, a CA area and a DA area opposite thereto (which are partial areas of the display device) may be surrounded by the first polarizing member 320a.

That is, in the TAC layer 321a configuring the first polarizing member 320a, surfaces parallel to the light source are also formed to extend, and therefore, as illustrated in FIG. 2, the TAC layer 321a surrounds the CA area and DA area opposite thereto of the display device, thus enhancing coupling power between the liquid crystal panel 100 and the backlight unit 110a.

As illustrated in FIG. 9B, the light leakage preventing member 140 that prevents a light leakage of the light source may be coupled to the polarizing part 320.

In more detail, according to the third embodiment, the light leakage preventing member 140 may be coupled to at least one of one surface and the other surface of the TAC layer 321a configuring the first polarizing member 320a.

That is, as illustrated, the light leakage preventing member 140 is coupled to an outer surface of the TAC layer 321a that surrounds the outside of the liquid crystal panel 100 and the outside of the backlight unit 110a.

Alternatively, the light leakage preventing member 140 may be coupled to an inner surface of the TAC layer 321a.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device.

Therefore, light of the light source is prevented from being leaked to outside the display device.

When the light leakage preventing member 140 is coupled to the inner surface of the TAC layer 321a, a member having a color instead of black may be coupled to the outer surface of the TAC layer 321a.

For example, when the light leakage preventing member 140 is coupled to the inner surface of the TAC layer 321a, a member having a fluorescent color may be coupled to the outer surface of the TAC layer 321a, thus providing a beautiful design to a user.

FIGS. 9A and 9B are cross-sectional views taken along line I-I' of FIG. 2 and illustrating a fourth embodiment of a display device according to the present invention. In describing the embodiment, a description on elements equal to or corresponding to the preceding embodiment is not provided. Hereinafter, a display device according to the embodiment will be described with reference to FIGS. 8A and 8B.

The display device according to the fourth embodiment of the present invention includes a liquid crystal panel 100, a backlight unit 110a including a light source that supplies light to the liquid crystal panel 100, and a polarizing part 420.

The polarizing part 420 configuring the display device includes a first polarizing member 420a and a second polarizing member 420b.

In more detail, the first polarizing member 420a is adhered onto the liquid crystal panel 100, and the second polarizing member 420b is adhered to under the liquid crystal panel 100.

Figure 10A:
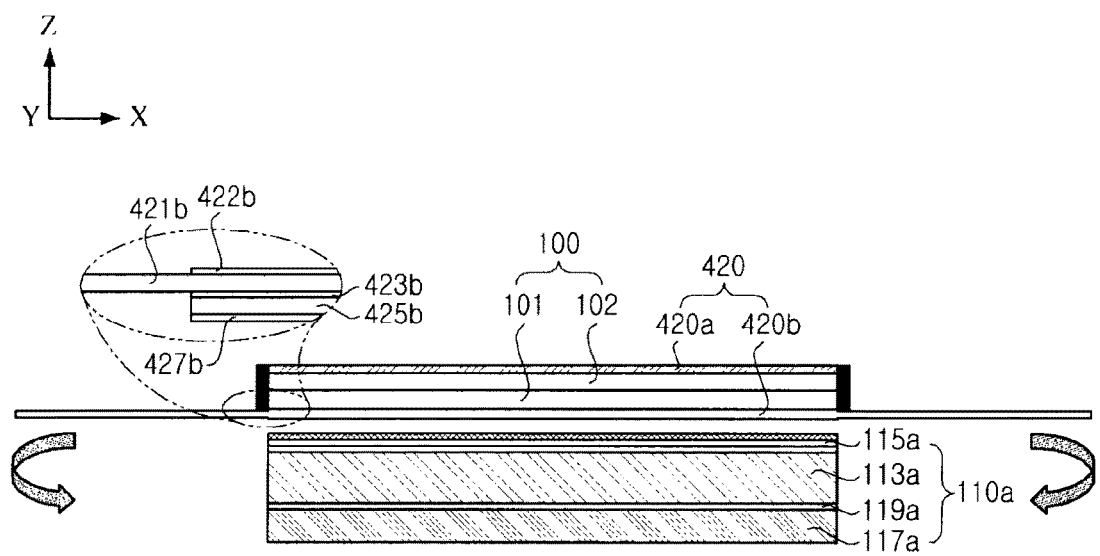
FIGS. 10A and 10B are cross-sectional views taken along line I-I' of FIG. 1 and illustrating a fourth embodiment of a display device according to the present invention.

As illustrated in an enlarged view of FIG. 10A, the second polarizing member 420b includes a TAC layer 421b.

Moreover, the second polarizing member 420b includes a PSA layer 422b stacked on the TAC layer 421b.

In addition, the second polarizing member 420b includes a PVA layer 423b stacked under the TAC layer 421b, a TAC layer 425b stacked under the PVA layer 423a, and a PSA layer 427b adhered to under the TAC layer 425b.

Each of the layers configuring the second polarizing member 420b will now be described with reference to FIG. 10A.

The TAC layer 421b is a protective layer for protecting the PVA layer 423b, and is formed of a transparent material.

The PSA layer 422b is a pressure sensitive adhesive layer, and adheres the second polarizing member 420b to under the liquid crystal panel 100.

The PVA layer 423b polarizes light passing through the liquid crystal panel 100.

The TAC layer 425b have the same material and function as those of the above-described TAC layer 421b.

Finally, the PSA layer 427b have the same material and function as those of the above-described PSA layer 422b.

Similarly to the first polarizing member 120a which has been described above with reference to FIG. 4A, a bending part that guides the second polarizing member 420b being bent for surrounding the outside of the liquid crystal panel 100 and the outside of the backlight unit 110a is formed at one surface of the TAC layer 421b configuring the second polarizing member 420b.

Figure 10B:
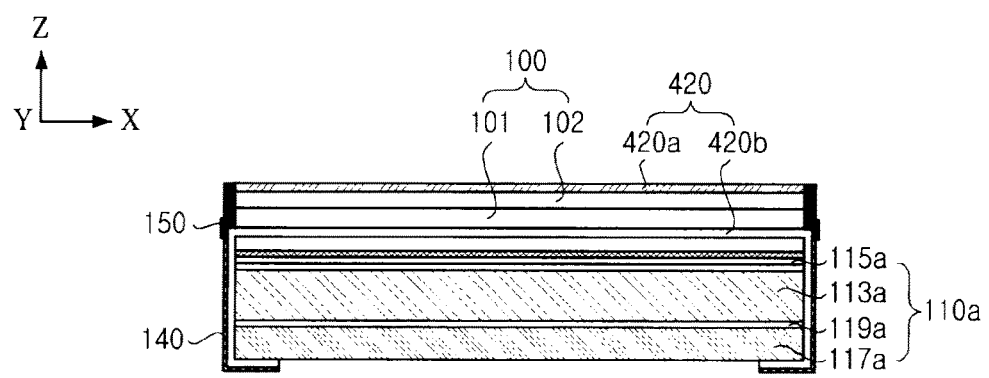

Therefore, as illustrated in FIG. 10B, the TAC layer 421b configuring the second polarizing member 420b surrounds the outside of the backlight unit 110a.

More specifically, as illustrated in FIG. 10A, the TAC layer 421b is formed to extend in an outer direction of the liquid crystal panel 100.

That is, as illustrated in FIGS. 2 and 3A, a side surface of the TAC layer 421b in a direction vertical to the light source, disposed in a direction (the X-axis direction) in which the power data supplying member 160 is connected, is formed to extend in the X-axis direction.

Moreover, as illustrated in FIG. 10B, the TAC layer 421b configuring the second polarizing member 420b surrounds the outside of the backlight unit 110a.

The structure such as the case top and the guide panel configuring the related art display device is removed, and the liquid crystal panel 100 is integrated with the backlight unit 110a by using the TAC layer 421b, thus lightening the display device.

In addition, in the TAC layer 421b of FIGS. 10A and 10B, a side surface vertical to the light source is formed to extend in the X-axis direction, but a side surface of the TAC layer 421b parallel to the light source may be formed to extend in the Y-axis direction.

Therefore, as illustrated in FIG. 2, except the power data supplying member 160, a CA area and a DA area opposite thereto (which are partial areas of the display device) may be surrounded by the second polarizing member 420b.

That is, in the TAC layer 421b configuring the second polarizing member 420b, surfaces parallel to the light source are also formed to extend, and therefore, as illustrated in FIG. 2, the TAC layer 421b surrounds the CA area and DA area opposite thereto of the display device, thus enhancing coupling power between the liquid crystal panel 100 and the backlight unit 110a.

As illustrated in FIG. 10B, the light leakage preventing member 140 that prevents a light leakage of the light source may be coupled to the polarizing part 420.

In more detail, according to the fourth embodiment, the light leakage preventing member 140 may be coupled to at least one of one surface and the other surface of the TAC layer 421b configuring the second polarizing member 420b, for preventing light of the light source from being leaked to outside the display device.

That is, as illustrated, the light leakage preventing member 140 is coupled to an outer surface of the TAC layer 421b that surrounds the outside of the backlight unit 110a.

Alternatively, the light leakage preventing member 140 may be coupled to an inner surface of the TAC layer 421b.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device.

Therefore, light of the light source is prevented from being leaked to outside the display device.

When the light leakage preventing member 140 is coupled to the inner surface of the TAC layer 421b, a member having a color instead of black may be coupled to the outer surface of the TAC layer 421b.

For example, when the light leakage preventing member 140 is coupled to the inner surface of the TAC layer 421b, a member having a fluorescent color may be coupled to the outer surface of the TAC layer 421b, thus providing a beautiful design to a user.

As illustrated in FIGS. 10A and 10B, a side sealing part for preventing a damage (caused by an external impact) and light leakage of the liquid crystal panel 100 may be formed at a side surface of the liquid crystal panel 100.

Moreover, a sealing member 150 may be coated on an outer surface of the light leakage preventing member 140 surrounding the outside of the backlight unit 110a and on the outside of the liquid crystal panel 100.

Accordingly, coupling power between the liquid crystal panel 100 and the backlight unit 110a can be enhanced.

As described above, by reducing a thickness of the display device as much as possible, the present invention can design the display device to have a slim design, and realize a zero-bezel.

Moreover, the present invention integrates the liquid crystal panel and the backlight unit by using the polarizing part, thus lightening the display device.

Moreover, the present invention closely adheres the liquid crystal panel to the backlight unit by using the polarizing part, and thus can thin the display device and enhance coupling power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a liquid crystal panel;
a backlight unit that has an accommodating member configured to include a light source, a light guide panel and a plurality of optical sheets, and that supplies a light to the liquid crystal panel; and
first and second polarizing members adhered to the liquid crystal panel, with the liquid crystal panel interposed therebetween, the second polarizing member polarizing the light supplied from the backlight unit and transferring the polarized light to the liquid crystal panel, the first polarizing member polarizing a light directly emitted from the liquid crystal panel without an intervening polarizer so as to enable an external user to view a desired image,
wherein one of the first and second polarizing members is extended to surround side surfaces of the liquid crystal panel and the backlight unit, and is attached to a bottom surface of the accommodating member.

2. The display device of claim 1, wherein the first polarizing member comprises a bending part for surrounding an outside of the liquid crystal panel and an outside of the backlight unit.

3. The display device of claim 1, wherein the second polarizing member comprises a bending part for surrounding an outside of the backlight unit.

4. The display device of claim 1, wherein in the first polarizing member, at least one of surfaces vertical to and surfaces parallel to the light source is formed to extend in the outer direction of the liquid crystal panel, and surrounds the outside of the liquid crystal panel and the outside of the backlight unit.

5. The display device of claim 1, wherein in the second polarizing member, at least one of surfaces vertical to and surfaces parallel to the light source is formed to extend in the outer direction of the liquid crystal panel, and surrounds the outside of the backlight unit.

6. The display device of claim 1, wherein the first polarizing member includes a TAC (Triacetyl Cellulose) layer; and the second polarizing member adhered under the liquid crystal panel.

7. The display device of claim 6, wherein the TAC layer comprises a bending part configured to guide the TAC layer being bent for surrounding the outside of the liquid crystal panel and an outside of the backlight unit.

8. The display device of claim 6, wherein in the TAC layer, at least one of surfaces vertical to and surfaces parallel to the light source is formed to extend in the outer direction of the liquid crystal panel, and surrounds the outside of the liquid crystal panel and the outside of the backlight unit.

9. The display device of claim 1, wherein the second polarizing member adhered under the liquid crystal panel, and configured to include a TAC (Triacetyl Cellulose) layer.

10. The display device of claim 9, wherein the TAC layer comprises a bending part configured to guide the TAC layer being bent for surrounding an outside of the backlight unit.

11. The display device of claim 9, wherein in the TAC layer, at least one of surfaces vertical to and surfaces parallel to the light source is formed to extend in the outer direction of the liquid crystal panel, and surrounds the outside of the backlight unit.

12. The display device of claim 1, wherein the backlight unit comprises:
the light guide panel configured to supply light emitted from the light source, toward the liquid crystal panel;
the plurality of optical sheets configured to diffuse and collect the light supplied from the light guide panel;
the accommodating member configured to comprise a plurality of supporting parts that support the liquid crystal panel, an accommodating part being formed in the accommodating member; and
a reflective sheet disposed between the light guide panel and the accommodating member to reflect light, leaked from the light guide panel, toward the liquid crystal panel.

13. The display device of claim 1, wherein the backlight unit comprises:
the light guide panel configured to supply light emitted from the light source, toward the liquid crystal panel;
the plurality of optical sheets configured to diffuse and collect the light supplied from the light guide panel;
a light source accommodating member configured to comprise a supporting part that supports the liquid crystal panel, the light source being disposed in the light source accommodating member;
a liquid crystal panel supporting part configured to comprise a plurality of supporting members that support the liquid crystal panel, an accommodating part being formed in the liquid crystal panel supporting part; and
a reflective sheet configured to reflect light, leaked from the light guide panel, toward the liquid crystal panel.

14. The display device of claim 13, wherein the liquid crystal panel supporting part comprises:
a first supporting member formed to surround an outer circumference surface of the light source accommodating member, and configured to support the liquid crystal panel; and
a second supporting member formed to be opposite to a non-incident part of the light guide panel, the second supporting member comprising a plurality of stepped portions in which the light guide panel, the plurality of optical sheets, and the reflective sheet are accommodated.

15. The display device of claim 1, further comprising a light leakage preventing member coupled to the first polarizing member surrounding an outside of the liquid crystal panel and an outside of the backlight unit to prevent the light of the light source from being leaked.

16. The display device of claim 15, wherein the light leakage preventing member is coupled to a portion of the first polarizing member that surrounds the side surface.

17. The display device of claim 15, wherein the light leakage preventing member is formed of at least one of a light blocking tape, a light absorbing member, a black printing member, and a black dye.

* * * * *